United States Patent
Jung et al.

(10) Patent No.: US 8,137,837 B2
(45) Date of Patent: Mar. 20, 2012

(54) SECONDARY BATTERY PACK HAVING EXCELLENT PRODUCTION PROCESS PROPERTY AND STRUCTURAL STABILITY

(75) Inventors: Soonkwang Jung, Seoul (KR); Sukjin Song, Yongin-si (KR)

(73) Assignee: LG Chem, Ltd., Seoul (KR)

( * ) Notice: Subject to any disclaimer, the term of this patent is extended or adjusted under 35 U.S.C. 154(b) by 228 days.

(21) Appl. No.: 12/445,336

(22) PCT Filed: Oct. 4, 2007

(86) PCT No.: PCT/KR2007/004836
§ 371 (c)(1),
(2), (4) Date: Sep. 2, 2009

(87) PCT Pub. No.: WO2008/050955
PCT Pub. Date: May 2, 2008

(65) Prior Publication Data
US 2009/0317715 A1 Dec. 24, 2009

(30) Foreign Application Priority Data

Oct. 23, 2006 (KR) .................... 10-2006-0102632
Oct. 23, 2006 (KR) .................... 10-2006-0102633

(51) Int. Cl.
*H01M 2/02* (2006.01)
(52) U.S. Cl. ...................................... 429/179
(58) Field of Classification Search ............. 429/61, 429/62, 65, 90, 178, 179
See application file for complete search history.

(56) References Cited

U.S. PATENT DOCUMENTS

| 7,510,791 B2 * | 3/2009 | Moon et al. .................... 429/7 |
| 7,622,219 B2 * | 11/2009 | Ota et al. ...................... 429/163 |
| 7,939,194 B2 * | 5/2011 | Kwon et al. .................. 429/129 |
| 2005/0208346 A1 | 9/2005 | Moon et al. |
| 2005/0266279 A1 | 12/2005 | Kim |
| 2006/0057459 A1 | 3/2006 | Kwon et al. |

FOREIGN PATENT DOCUMENTS

| JP | 2004-335387 A | 11/2004 |
| JP | 2006-4783 A | 1/2006 |
| JP | 2006-147193 A | 6/2006 |
| JP | 2006-164531 A | 6/2006 |
| KR | 10-2006-0032591 A | 4/2006 |
| KR | 10-0723668 B1 | 5/2007 |
| WO | 2004/112182 A1 | 12/2004 |

\* cited by examiner

*Primary Examiner* — Javaid Nasri
(74) *Attorney, Agent, or Firm* — Birch, Stewart, Kolasch & Birch, LLP (57) ABSTRACT

A secondary battery pack is provided. The secondary battery pack includes a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being constructed in a structure in which a safety element is mounted to the top of the insulative mounting member, the insulative mounting member being in direct contact with the top of the battery cell, and an insulative cap coupled to the top of the battery cell such that the insulative cap surrounds the insulative mounting member while the safety element is mounted to the insulative mounting member.

23 Claims, 9 Drawing Sheets

SECONDARY BATTERY PACK HAVING EXCELLENT PRODUCTION PROCESS PROPERTY AND STRUCTURAL STABILITY

FIELD OF THE INVENTION

The present invention relates to a secondary battery pack constructed such that an insulative mounting member is coupled to the top of a battery cell through a specific coupling structure, and, more particularly, to a secondary battery pack including a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being constructed in a structure in which a safety element is mounted to the top of the insulative mounting member, the insulative mounting member being in direct contact with the top of the battery cell, and an insulative cap coupled to the top of the battery cell such that the insulative cap surrounds the insulative mounting member while the safety element is mounted to the insulative mounting member, wherein the battery case is provided at the top thereof with at least one coupling groove, and the insulative mounting member is provided with at least one through-hole communicating with the at least one coupling groove, whereby the coupling of the insulative mounting member to the battery cell is accomplished by the insertion of at least one coupling member into the at least one coupling groove through the at least one through-hole such that the at least one coupling member is not exposed to the outside of the insulative cap.

BACKGROUND OF THE INVENTION

As mobile devices have been increasingly developed, and the demand of such mobile devices has increased, the demand of secondary batteries has also sharply increased. Among them is a lithium secondary battery having high energy density and voltage and excellent preservation and service-life characteristics, which has been widely used as an energy source for various electronic products as well as the mobile devices.

On the other hand, various kinds of combustible materials are contained in the lithium secondary battery. As a result, the lithium secondary battery may be heated or explode due to the overcharge of the battery, the overcurrent in the battery, or other physical external impacts. That is, the safety of the lithium secondary battery is very low. Consequently, the lithium secondary battery includes a protection circuit module (PCM), which is connected to the battery cell for effectively controlling an abnormal state of the battery, such as the overcharge of the battery.

Generally, the PCM is connected to the battery cell using a conductive material, such as a nickel plate, by welding or soldering, which increases a coupling force between the PCM and the battery cell. However, the welding or soldering process requires a high degree of technical skill, with the result that skilled persons are needed. Also, the welding or soldering process requires a large working space. Furthermore, when physical impacts are applied to the battery cell, electrical shorts may occur, and therefore, the battery cell may catch fire or explode. In other words, safety-related problems may occur.

Consequently, research on various technologies that are capable of complementing drawbacks of the welding or soldering process, while maintaining advantages of the welding or soldering process, is being actively pursued. For example, Japanese Patent Application Publication No. 2004-335387 discloses a structure in which a circuit board block, which is integrated with a circuit board, is provided at opposite ends thereof with through-holes, rod-shaped connecting members, which are made of a metal material, are inserted through the corresponding through-holes, such that the connecting members are brought into contact with the top of a battery cell, and the connecting members are coupled to the top of the battery cell by resistance welding.

However, the above-described technology has a problem in that the welding process is still used to couple the rod-shaped connecting members to the top of the battery cell, and therefore, the manufacturing process is difficult, and the safety of the battery cell is still low.

Also, Japanese Patent Application Publication No. 2006-147193 discloses a structure in which a battery case is provided at the top thereof with a female type coupling structure, a plate-shaped protection circuit board is provided at opposite sides thereof with through-holes, a battery pack cover is also provided at opposite sides thereof with through-holes, screws are threadedly inserted into the female type coupling structure of the battery case through the through-holes, while the protection circuit board is placed on the top of the battery case, and the battery pack cover is mounted to the top of the battery case. Japanese Patent Application Publication No. 2006-04783 discloses a structure in which coupling protrusions are formed at the top of a battery cell by welding, a battery pack cover is provided with female type coupling members corresponding the coupling protrusions, and the battery pack cover is coupled to the battery cell by forcibly inserting the coupling protrusions into the corresponding female type coupling members.

However, the above-described technologies have a problem in that an additional coupling structure is formed at the top of the battery cell, which is very troublesome. Especially for the latter case, the protrusion type coupling structure is formed at the top of the battery cell, and, a welding process is used to form the protrusion type coupling structure, whereby the manufacturing process is difficult, and the safety of the battery cell is still low.

Also, Japanese Patent Application Publication No. 2006-164531 discloses a battery pack including a battery cell, a circuit board mounted to the top of the battery cell, and an upper case, wherein the upper case is fixed to the top of the battery cell by threadedly inserting screws into coupling grooves formed at the top of the battery cell through through-holes formed through the upper case. Korean Patent Application Publication No. 2006-32591 discloses a secondary battery constructed in a structure in which an upper cover is mounted to the top of a battery core, while a structure supporting member for supporting a protection circuit board is inserted, the battery core is provided at the top thereof with position holes and screw holes, the upper cover is provided at the bottom thereof with position notches and screw openings, and the upper cover is coupled to the top of the battery core by engaging the position notches into the corresponding position holes and threadedly inserting screws into the screw holes through the screw openings.

However, the above-described technologies have problems in that an additional member is inserted between terminals of the battery cell and the protection circuit board for accomplishing the electrical insulation between the terminals of the battery cell and the protection circuit board, and it is required to provide additional connecting members, such as connection pins, for the electrical connection with the electrode terminals, whereby the assembly process is complicated.

Especially for the latter case, the connecting members may be easily separated from the electrode terminals, with the result that an external short circuit may occur, and the battery pack may become defective during the handling and manufacture of the battery pack. Such additional provision of the insulative/conductive members complicates the assembly process. Also, the manufacturing process is very complicated, and the safety of the battery cell is deteriorated, when the welding process is used. Furthermore, the screws necessary for the coupling are partially exposed to the outside, with the result that a possibility of a short circuit occurring is increased. In addition, the battery does not exhibit a pleasing aesthetic appearance, which acts as a deterring factor when consumers choose products.

Consequently, there is a high necessity for a technology that is capable of reducing the number of members mounted to the top of the battery cell to simplify the assembly process and securing no-welding type stable coupling strength between the battery cell and the mounting members.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present invention have found that, when an insulative mounting member is coupled to the top of a battery cell, through a specific coupling structure, to construct a secondary battery pack, the assembly process of the secondary battery pack is greatly simplified, the safety of the battery cell during the manufacture of the battery cell is secured, and, at the same time, it is possible to maintain an improved coupling strength.

Therefore, it is an object of the present invention to provide a secondary battery pack constructed such that an insulative mounting member is coupled to the top of a battery cell through a specific coupling structure.

In accordance with the present invention, the above and other objects can be accomplished by the provision of a secondary battery pack including a battery cell having an electrode assembly of a cathode/separator/anode structure mounted in a battery case together with an electrolyte in a sealed state, an insulative mounting member having openings, through which electrode terminals of the battery cell are exposed to the outside, the insulative mounting member being constructed in a structure in which a safety element is mounted to the top of the insulative mounting member, the insulative mounting member being in direct contact with the top of the battery cell, and an insulative cap coupled to the top of the battery cell such that the insulative cap surrounds the insulative mounting member while the safety element is mounted to the insulative mounting member, wherein the battery case is provided at the top thereof with at least one coupling groove, and the insulative mounting member is provided with at least one through-hole communicating with the at least one coupling groove, whereby the coupling of the insulative mounting member to the battery cell is accomplished by the insertion of at least one coupling member into the at least one coupling groove through the at least one through-hole such that the at least one coupling member is not exposed to the outside of the insulative cap.

The secondary battery pack according to the present invention includes the battery cell, in which the electrode assembly is mounted, the insulative mounting member, on the top of which the safety element is mounted such that the insulative mounting member is in tight contact with the top of the battery cell, and the insulative cap, which is coupled to the top of the battery cell. Consequently, the coupling between the insulative mounting member and the battery cell is accomplished by the insertion of at least one coupling member into the at least one coupling groove through the at least one through-hole.

In this structure, the at least one coupling member is not exposed to the outside. Consequently, a possibility of a short circuit occurring is minimized while the pleasing aesthetic appearance of the battery pack is not deteriorated. Furthermore, the number of members mounted to the top of the battery cell is reduced through the insulative mounting member, with the result that the assembly process is simplified, and therefore, the production efficiency is improved.

It is required for the battery case to be easily manufactured and to exhibit a mechanical strength greater than a predetermined level. For this reason, the battery case is a metal container, preferably an aluminum container.

The insulative mounting member is constructed in a structure in which the safety member is mounted on the top of the insulative mounting member. The insulative mounting member is an insulative member that is in direct contact with the top of the battery cell. In a preferred embodiment, the insulative mounting member has a size approximately corresponding to that of the top of the battery cell, the insulative mounting member is provided at the middle thereof with a first opening, through which the first electrode terminal of the battery cell is exposed to the outside, and the insulative mounting member is provided at a position spaced a predetermined distance from the first opening with a second opening, through which a portion of the top of the battery case of the battery cell (the second electrode terminal) is exposed to the outside.

In a preferred embodiment, the insulative mounting member is provided at opposite-side ends thereof with structures (protruding structures) protruding upward by a predetermined height such that the safety element can be stably coupled to the top of the insulative mounting member. Preferably, each protruding structure has a supporting part formed at the inside thereof in the horizontal direction. The protruding structures and the supporting parts serve to support the opposite ends of the safety element (for example, a protection circuit board) such that the safety element can be stably mounted on the insulative mounting member. According to circumstances, the insulative mounting member may be provided wholly or partially at the front and/or the rear thereof with a side wall having approximately the same height as the protruding structures. Also, the side wall may be provided with a protrusion or a groove, and the safety element may be provided partially at the outside thereof with a groove or a protrusion corresponding to the protrusion or the groove of the side wall. Consequently, the safety element is stably mounted on the insulative mounting member by the engagement between the protrusion or the groove of the side wall and the groove or the protrusion of the safety element.

The safety element may include a rectangular protection circuit module (PCM) having a protection circuit for controlling the overcharge, the overdischarge, and the overcurrent of the battery and a pair of connecting members electrically connected to the protection circuit, which is mounted to the bottom of the rectangular protection circuit module. For example, the safety element may be one or more selected from a group consisting of a positive temperature coefficient (PTC) element, a fuse, and a protection circuit board.

According to circumstances, the safety element may include the PTC element and the protection circuit board. One end of the PTC element may be connected to the first electrode terminal of the battery cell, the other end of the PTC element may be connected to the protection circuit board, and the second electrode terminal of the battery cell may be connected to the protection circuit board.

Preferably, the electrical connection (a) between the PTC element and the protection circuit board and the electrical connection (b) between the second electrode terminal of the battery cell and the protection circuit board are carried out by variable connecting members. More preferably, the connecting member for the electrical connection (a) and the member for the electrical connection (b) are coupled to the protection circuit board, and the connecting members are coupled to the respective electrode terminals of the battery cell.

The connecting members are not particularly restricted so long as the connecting members are made of a variable conductive material. Preferably, the connecting members are nickel plates.

The connecting members are coupled to the electrode terminals of the battery cell, while the protection circuit board is placed on the top of the battery cell such that the angle between the protection circuit board and the top of the battery cell is approximately 90 degrees or more, the variable connecting members are bent such that the protection circuit board is placed on the insulative mounting member while the protection circuit board is parallel with the top of the battery cell, and the connecting members are coupled to the protection circuit board such that the bent portions of the connecting members are directed to the same side.

For example, the nickel plates may be coupled to the electrode terminals by spot welding, while the plate-shaped PCM is located such that the PCM is perpendicular to the top of the battery cell, and the nickel plates may be bent such that the PCM is placed on the insulative mounting member while the PCM is in parallel with the top of the battery cell.

The at least one coupling member is not particularly restricted so long as the coupling member exhibits a mechanical strength greater than a predetermined level after the at least one coupling member is inserted into the at least one coupling groove through the at least one through-hole.

In a preferred embodiment, the at least one coupling member is a metal pin. Preferably, the metal pin has an outer diameter equal to or slightly greater than the inner diameter of the corresponding coupling groove of the battery case such that the metal pin is inserted into the corresponding coupling groove in a forced fitting fashion. The forced fitting fashion is a fashion in which the metal pin is located at the entrance of the corresponding through-hole, an external force is applied to the metal pin above the metal pin, using a hammer, such that the metal pin is inserted into the coupling groove through the through-hole. Also, the metal pin is inserted in the longitudinal direction of the battery cell, with the result that the coupling structure between the coupling grooves, the through-holes, and the metal pin may be weaker due to the longitudinal tensile force than due to vertical impacts applied to the battery cell. Consequently, the coupling member may be inserted into the coupling groove through the through-hole, after an adhesive agent is injected into the coupling groove and/or the through-hole, to solve the above-mentioned problem.

In another embodiment, the at least one coupling member has a thread part formed at the outside thereof. For example, the at least one coupling member may be a screw or a bolt. Preferably, the at least one coupling member is a screw. A female type thread structure corresponding to the at least one coupling member may be formed at the inside of the at least one coupling groove, formed at the top of the battery case.

Alternatively, a female type thread structure may be formed at the inside of the at least one coupling groove during the insertion of the at least one coupling member into the at least one coupling groove. Consequently, the formation of the female type thread structure at the inside of the at least one coupling groove is not critical. Consequently, when the thread part, corresponding to the coupling member, is formed at the coupling groove, the engaging force between the coupling member and the coupling groove is further increased, and therefore, a more stable structure is maintained.

The coupling member has a length not exposed to the outside of the insulative cap. Preferably, the coupling member has a length equal to or slightly greater than the sum of the length of the through-hole, formed at the insulative mounting member, and the depth of the coupling groove, formed at the battery case.

According to circumstances, an adhesive agent may be applied to the top of the battery cell or the bottom of the insulative mounting member to complement the coupling strength provided by the coupling member.

The insulative cap serves to protect the battery cell against external impacts, to complement the mechanical strength of the members mounted to the top of the battery cell, and, at the same time, to maintain the electrical insulation. To this end, the insulative cap may extend downward by a predetermined length sufficient for at least some of the insulative cap to surround the outside of the top of the battery cell while the insulative cap is mounted on the battery cell. In order to maximize this effect, the downward extending portion of the insulative cap may be fixed to the outside of the top of the battery cell by a bonding fashion or a mechanical coupling fashion.

The secondary battery pack may further include another insulative cap (bottom cap) coupled to the bottom of the battery cell in addition to the insulative cap coupled to the top of the battery cell. Furthermore, the secondary battery pack may further include a sheathing film attached to the outer surface of the battery case of the battery cell. Consequently, it is possible to protect the battery cell against external impacts and to maintain the electrical insulation. Preferably, the sheathing film is attached to the outer surface of the battery case of the battery cell such that the sheathing film surrounds the downward extending portion of the insulative cap.

The secondary battery pack according to the present invention is applicable to any of the battery cells in various manners, irrespective of the kind and shape of the battery cells. Preferably, the battery cell is a prismatic lithium secondary battery cell.

BRIEF DESCRIPTION OF THE DRAWINGS

The above and other objects, features and other advantages of the present invention will be more clearly understood from the following detailed description taken in conjunction with the accompanying drawings, in which.

<Description of Main Reference Numerals of the Drawings>

| | |
|---|---|
| 100: | battery cell |
| 110: | coupling grooves |
| 200: | insulative mounting member |
| 210: | through-holes |
| 230: | metal pins |
| 231: | screws |
| 300: | safety element |
| 400: | insulative cap |

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
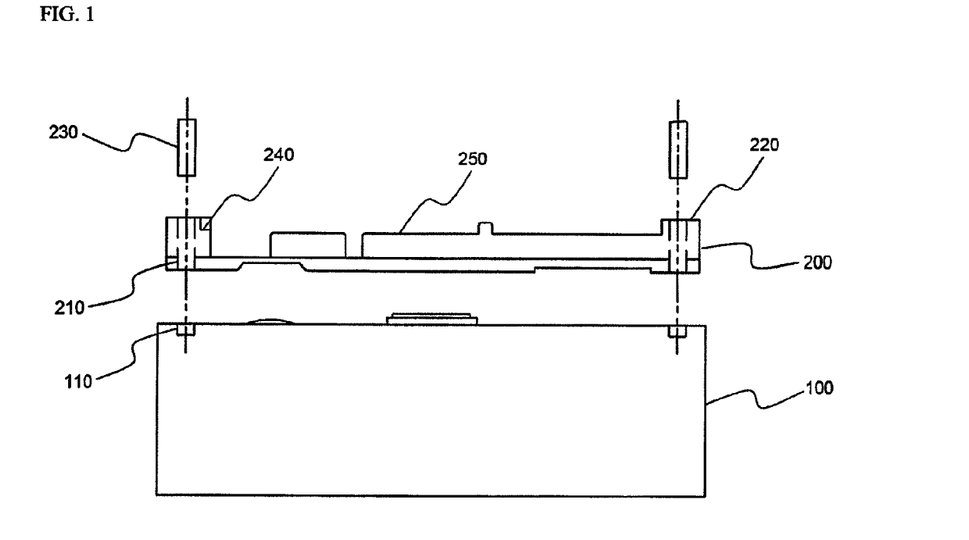
FIG. 1 is a front view illustrating the structure of a secondary battery pack according to a preferred embodiment of the present invention, before an insulative mounting member is coupled to a battery cell of the secondary battery pack.
Figure 2:
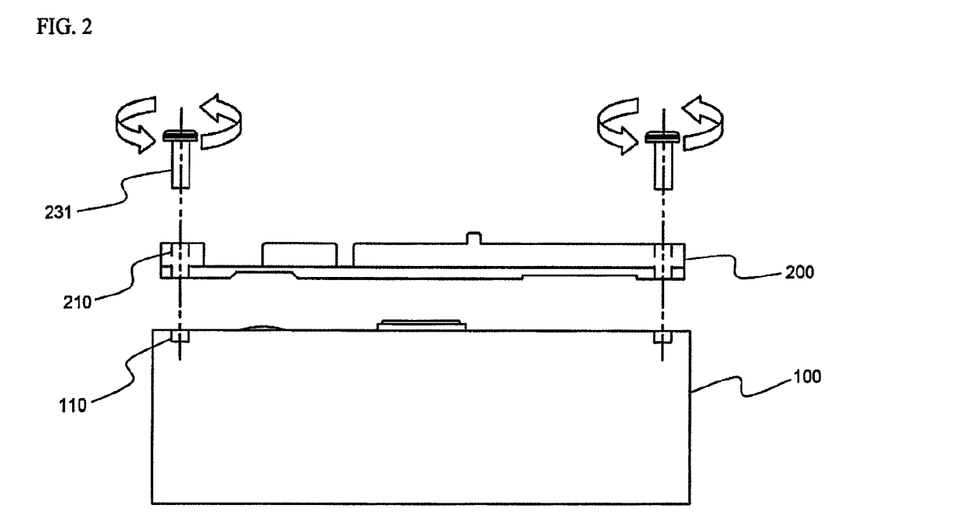
FIG. 2 is a front view illustrating the structure of a secondary battery pack according to another preferred embodiment of the present invention, before an insulative mounting member is coupled to a battery cell of the secondary battery pack.
Figure 3:
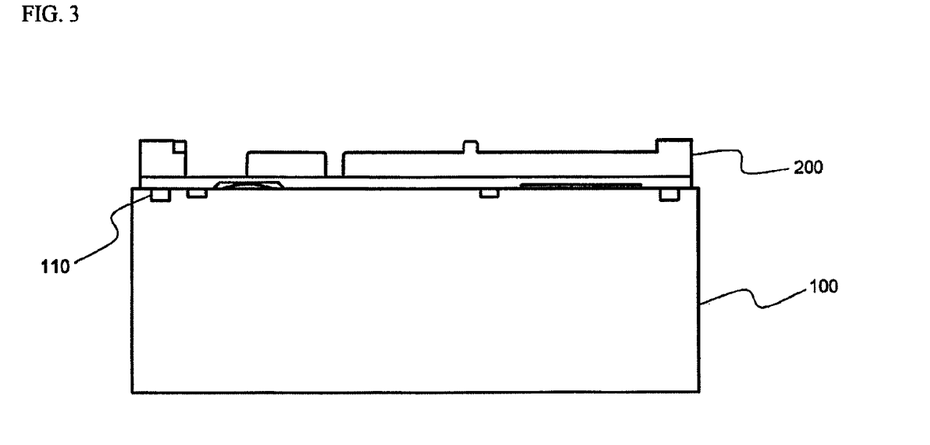
FIG. 3 is a front view illustrating the structure of the secondary battery pack shown in FIG. 1, after the insulative mounting member is coupled to the battery cell of the secondary battery pack.

FIG. 1 is a front view illustrating the structure of a secondary battery pack according to a preferred embodiment of the present invention, in which metal pins are used as coupling members, before an insulative mounting member is coupled to a battery cell of the secondary battery pack, FIG. 2 is a front view illustrating the structure of a secondary battery pack according to another preferred embodiment of the present invention, in which screws are used as coupling members, before an insulative mounting member is coupled to a battery cell of the secondary battery pack, and FIG. 3 is a front view illustrating the structure of the secondary battery pack shown in FIG. 1, after the insulative mounting member is coupled to the battery cell of the secondary battery pack.

Referring to these drawings, the secondary battery pack according to the present invention is constructed in a structure in which a plurality of coupling grooves 110 are formed at the top of the battery cell 100, the insulative mounting member 200 is provided with through-holes 210, which communicate with the coupling grooves 110, respectively, and metal pins 230 or screws 231 are inserted into the coupling grooves 110 through the through-holes 210, respectively. The battery cell 100 is constructed in a structure in which an electrode assembly (not shown) of a cathode/separator/anode structure is mounted in a battery case together with an electrolyte in a sealed state. Electrode terminals are formed at the top of the battery cell 100.

The insulative mounting member 200 is an insulating member having openings (not shown), through which the electrode terminals are exposed to the outside, while maintaining the electrical insulation between the battery cell 100 and the openings. Also, the insulative mounting member 200 is provided at the opposite-side ends thereof with structures 220 protruding upward by a predetermined height such that a safety element (not shown) can be stably coupled to the top of the insulative mounting member 200. At the inside of each protruding structure 220 is formed a supporting part 240 in the horizontal direction. The protruding structures 220 and the supporting parts 240 constitute a receiving part, in which the safety element is stably mounted. Also, the insulative mounting member 200 may be provided at the front and/or the rear thereof with a side wall 250 having approximately the same height as the supporting parts 240.

The through-holes 210, formed at the opposite sides of the insulative mounting member 200, communicate with the coupling grooves 110, formed at the top of the battery cell 100. The metal pins 230 or the screws 231, as the coupling members, are inserted into the coupling grooves 110 through the through-holes 120, respectively, whereby the coupling between the insulative mounting member 200 and the battery cell 100 is accomplished.

In addition to the metal pins 230 and the screws 231, other members that are capable of exhibiting a mechanical strength greater than a predetermined level, after being inserted into the coupling grooves 110 through the through-holes 210, may be used as the coupling members.

The metal pins 230 or the screws 231 have an outer diameter equal to or slightly greater than the inner diameter of the coupling grooves 110. When the metal pins 230 are used as the coupling members, the metal pins 230 are inserted into the corresponding coupling grooves in a forced fitting fashion, thereby stably accomplishing the coupling between the insulative mounting member 200 and the battery cell 100. When the screws 231 are used as the coupling members, on the other hand, a thread part may be formed inside each coupling groove 110 of the battery cell 100. Alternatively, the inside of each coupling groove 110 may be deformed, such that a female type thread structure is formed inside each coupling groove 110, during the insertion of the screws 230 into the coupling grooves 110 by the rotation of the screws 230. In this case, the secure coupling between the insulative mounting member 200 and the battery cell 100 is also accomplished.

Figure 4:
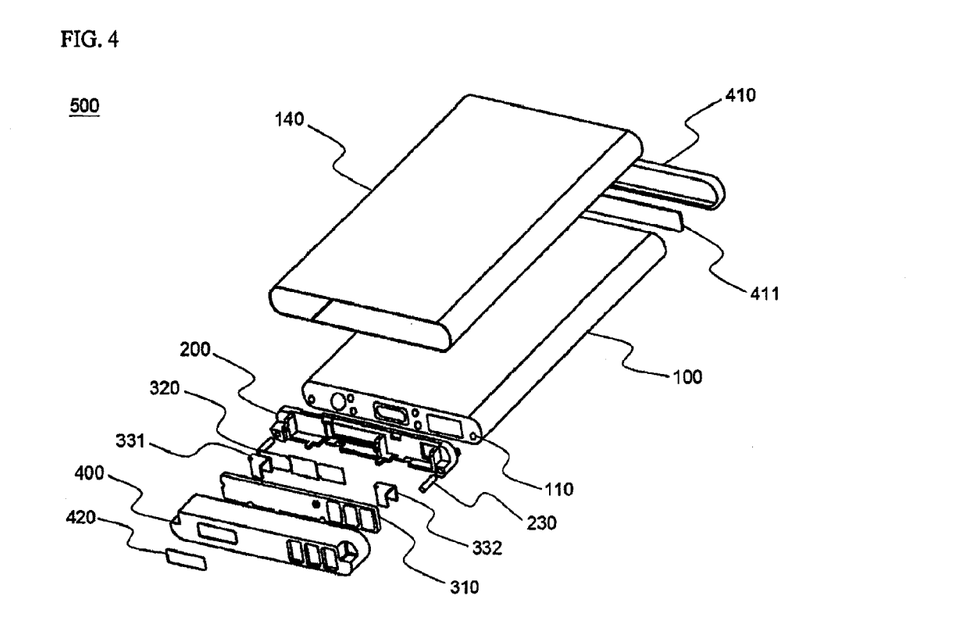
FIG. 4 is an exploded perspective view illustrating a secondary battery pack according to a preferred embodiment of the present invention.

FIG. 4 is an exploded perspective view illustrating a secondary battery pack according to a preferred embodiment of the present invention.

Referring to FIG. 4, the secondary battery pack 500 according to the present invention includes a battery cell 100, an insulative mounting member 200, a safety element including a protection circuit board 310 and a positive temperature coefficient (PTC) element 320, insulative top and bottom caps 400 and 410, and a sheathing film 140.

At the opposite-side ends of the top of the battery cell 100 are formed a plurality of coupling grooves 110, by which the insulative mounting member 200 is coupled to the top of the battery cell 100.

The insulative mounting member 200 has openings, through which electrode terminals of the battery cell 100 are exposed to the outside. The opposite-side ends of the insulative mounting member 200 protrude upward by a predetermined height such that the safety element can be stably coupled to the top of the insulative mounting member 200. The insulative mounting member 200 is coupled to the top of the battery cell 100 such that the insulative mounting member 200 is brought into direct contact with the top of the battery cell 100. The insulative mounting member 200 has through-holes 210 (see FIG. 1 or FIG. 2), which communicate with the corresponding coupling grooves 110. Metal pins 230, as coupling members, are inserted into the coupling grooves 110 through the through-holes 210, whereby the coupling between the insulative mounting member 200 and the battery cell 100 is accomplished.

The insulative top cap 400 is coupled to the top of the battery cell 100, such that the insulative top cap 400 surrounds the insulative mounting member 200, while the safety element is coupled to the top of the insulative mounting member 200. The insulative top cap 400 extends downward by a predetermined length sufficient to surround the outside of the top of the battery cell 100. To one side of the top of the insulative top cap 400 is attached a warranty label 420. The bottom cap 410 is attached to the bottom of the battery cell 100 by an adhesive bottom cap tape 411. The outer circumference of the battery cell 100 is surrounded by the insulative sheathing film 140. The structure of the safety element will be described below in detail with reference to FIG. 7.

Hereinafter, the top of the battery cell and the insulative mounting member, which will be coupled to the top of the battery cell, will be described in more detail with reference to FIGS. 5 and 6.

Figure 5:
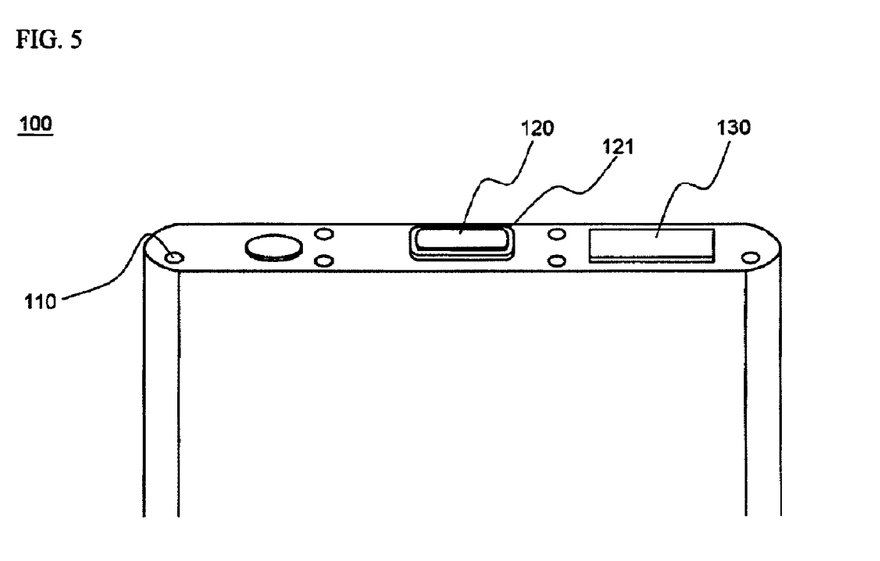
FIG. 5 is a partial perspective view illustrating the top of a battery cell according to a preferred embodiment of the present invention.

FIG. 5 is a partial perspective view illustrating the top of a battery cell according to a preferred embodiment of the present invention.

Referring to FIG. 5, an anode terminal 120 protrudes from the middle of the top of the battery cell 100, and a battery case, which is made of a metal material, constitutes a cathode. The anode terminal 120 is electrically insulated from the battery case by an insulative member 121, such as a gasket. Consequently, the cathode terminal 130 is formed by attaching a nickel clad member to a predetermined region of the top of the battery cell 100. A pair of coupling grooves 110 are formed at the opposite-side ends of the top of the battery cell such that the insulative mounting member 200 (see FIG. 4) is coupled to the top of the battery cell 100 by predetermined coupling members.

Figure 6:
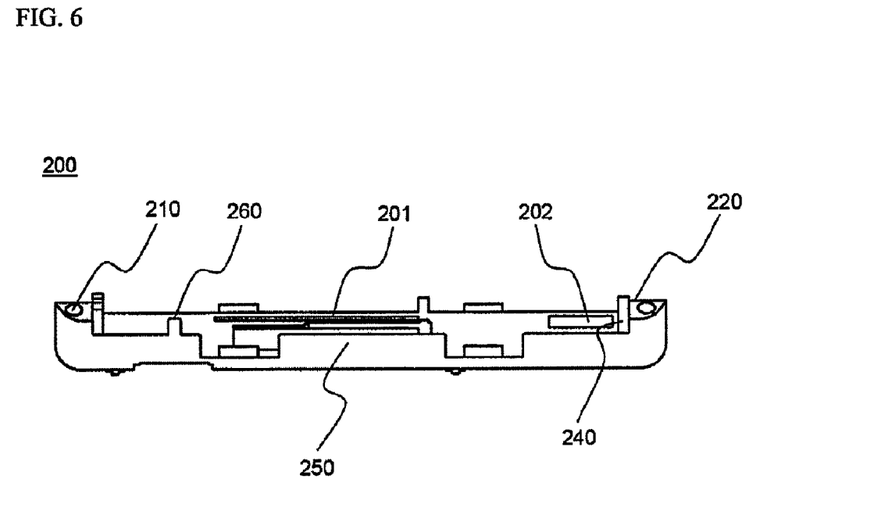
FIG. 6 is a perspective view illustrating an insulative mounting member, which will be coupled to the top of the battery cell according to the present invention.

FIG. 6 is a perspective view illustrating an insulative mounting member, which will be coupled to the top of the battery cell according to the present invention.

Referring to FIG. 6, the insulative mounting member 200 has a size approximately corresponding to that of the top of the battery cell 100. The insulative mounting member 200 is provided at the middle thereof with a first opening 201, through which the anode terminal 120 (see FIG. 5) of the battery cell 100 is exposed to the outside. Also, a second opening 202, through which the cathode terminal 130 (see FIG. 5), located at the top of the battery cell 100, is exposed to the outside, is formed at the insulative mounting member 200 such that the second opening 202 is spaced a predetermined distance from the first opening 201.

The insulative mounting member 200 is provided at the opposite-side ends thereof with structures 220 protruding upward by a predetermined height such that a safety element can be stably coupled to the top of the insulative mounting member 200. At the inside of each protruding structure 220 is formed a supporting part 240 in the horizontal direction. The protruding structures 220 and the supporting parts 240 constitute a receiving part, in which the safety element is stably mounted. According to circumstances, the insulative mounting member 200 may be provided at the front and/or the rear thereof with a side wall 250 having approximately the same height as the supporting parts 240. At the side wall 250 is formed a protrusion 260, which is engaged into, for example, a groove formed at a corresponding region of a protection circuit board 310 (see FIG. 4), thereby assisting the stable coupling of the protection circuit board 310.

Also, the insulative mounting member 200 is provided with through-holes 210, which communicate with the coupling grooves of the battery cell, respectively. When screws 231 (see FIG. 2) are used as coupling members, a thread part may be formed inside each through-hole 210. Alternatively, the inside of each through-hole 210 may be partially deformed, such that a female type thread structure is formed inside each through-hole 210, during the threaded insertion of the screws 230 into the coupling grooves 110, although no thread part may be formed inside each through-hole 210, because the insulative mounting member 200 is made of, for example, an insulative copolymer resin.

Figure 7:
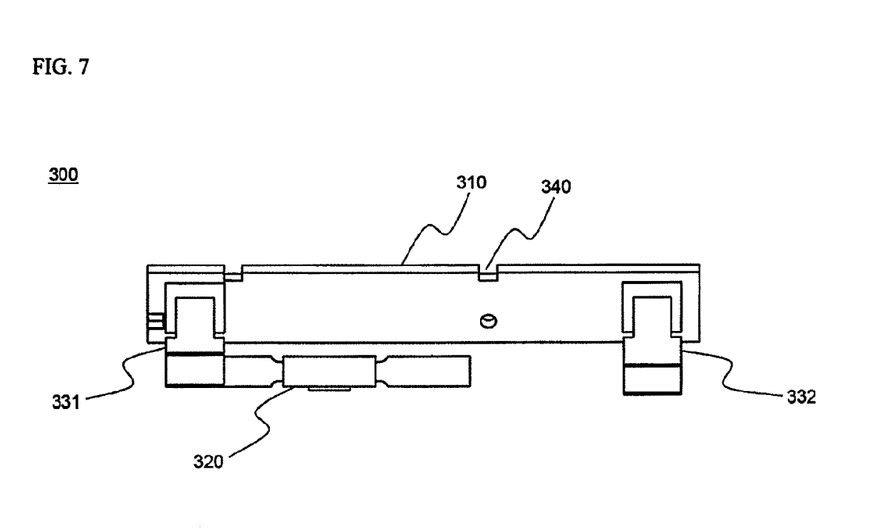
FIG. 7 is a perspective view illustrating a safety element, which will be coupled to the insulative mounting member according to the present invention.

FIG. 7 is a perspective view illustrating a safety element, which will be coupled to the insulative mounting member according to the present invention.

Referring to FIG. 7, the safety element 300 includes a protection circuit board 310 and a PTC element 320. The protection circuit board 310 is constructed in a printed circuit board (PCB) structure in which a protection circuit (not shown) for controlling the overcharge, the overdischarge, and the overcurrent of the battery is printed on a rectangular structure made of epoxy composite. The protection circuit board 310 is provided at the front and/or the rear thereof with a groove 340 corresponding to the protrusion 260 (see FIG. 6), formed at the side wall of the insulative mounting member 200 (see FIG. 6).

To the bottom of the protection circuit board 310 are also attached a pair of nickel plates 331 and 332, which are connecting members electrically connected to the protection circuit. Specifically, the nickel plates 331 and 332 are electrically connected to an anode and a cathode of the protection circuit board 310, respectively.

Consequently, one end of the PTC element 320 is connected to the anode terminal of the battery cell (not shown), the other end of the PTC element 320 is connected to the anode of the protection circuit board 310, and the cathode terminal of the battery cell is directly connected to the cathode of the protection circuit board 310, whereby the electrical connection between the safety element 300 and the battery cell is accomplished.

Hereinafter, a process for assembling the secondary battery pack shown in FIG. 1 will be described in detail with reference to FIGS. 8 to 11, which are partial front views illustrating the secondary battery pack assembly process.

Figure 8:
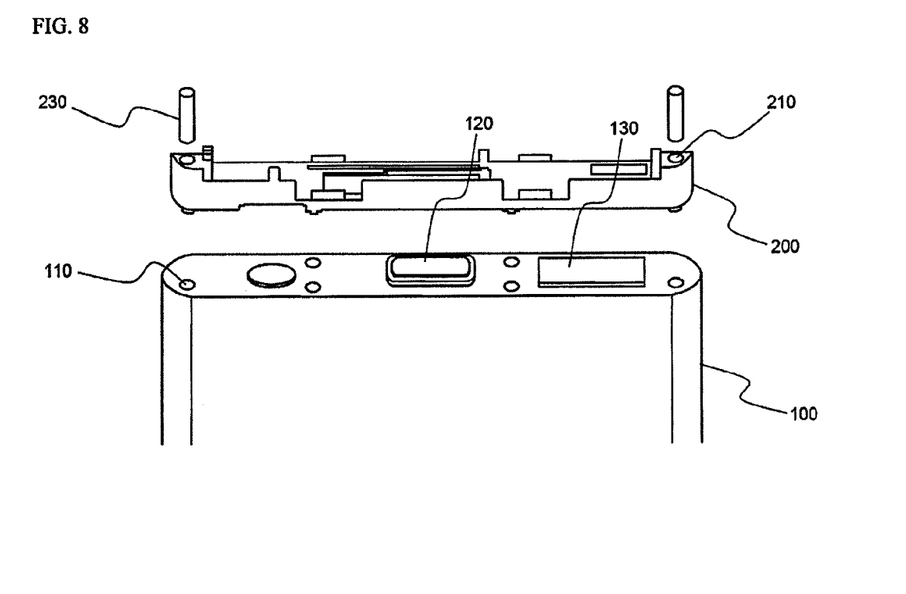
FIGS. 8 to 11 are partial front views illustrating a process for assembling the secondary battery pack shown in FIG. 1.

Referring first to FIG. 8, the battery cell 100 is provided at the opposite-side ends of the top thereof with a pair of coupling grooves 110, and the insulative mounting member 200 is provided with through-holes communicating with the coupling grooves of the battery cell 100. Metal pins 230, as coupling members, are inserted into the coupling grooves 110 through the through-holes 120, respectively, whereby the coupling between the insulative mounting member 200 and the battery cell 100 is accomplished. As previously described, the insertion of the metal pins 230 into the coupling grooves 110 is accomplished in a forced fitting fashion. Consequently, the coupling between the insulative mounting member 200 and the battery cell 100 is accomplished with a high coupling strength. According to circumstances, however, an adhesive agent may be injected in the coupling grooves 110 or the through-holes 210, or an adhesive agent is applied to the bottom of the insulative mounting member 200 or the top of the battery cell 100, whereby the coupling strength between insulative mounting member 200 and the battery cell 100 is further increased.

Figure 9:
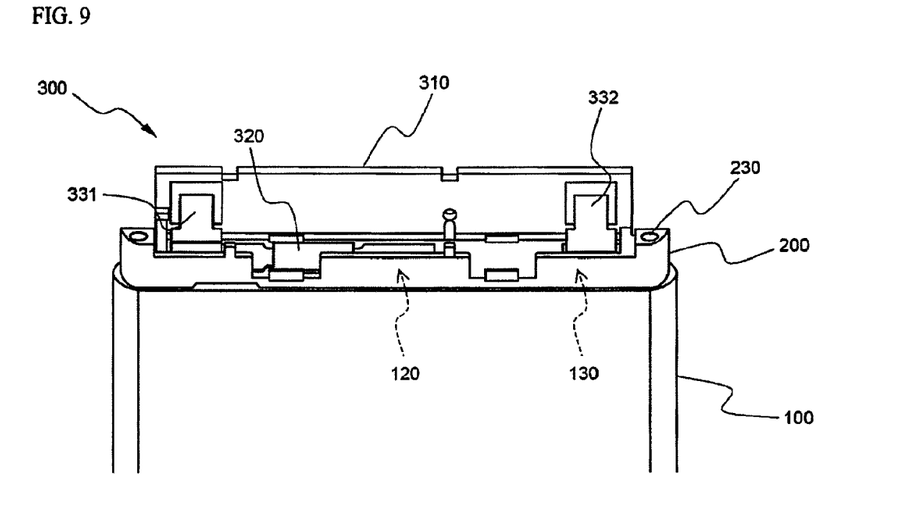
Figure 10:
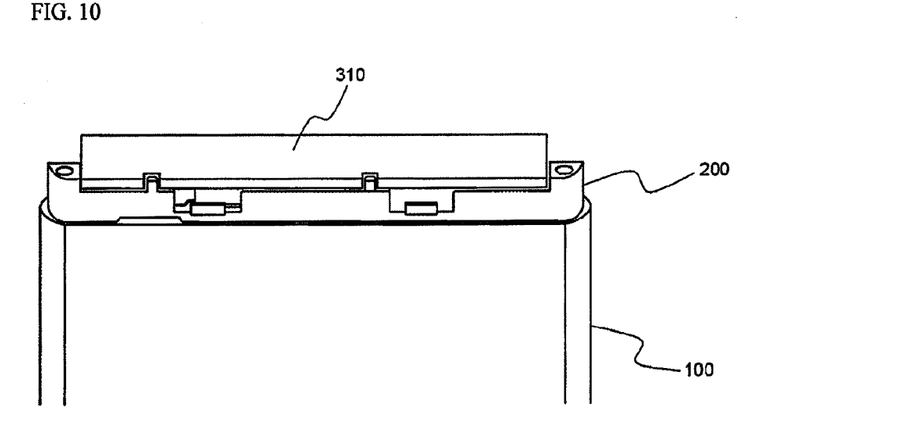

Subsequently, as shown in FIGS. 9 and 10, the safety element 300, including the protection circuit board 310 and the PTC element 320, is placed on the insulative mounting member 200. Specifically, while the protection circuit board 310 is located such that the protection circuit board 310 is perpendicular to the top of the battery cell 100, one end of the PTC element 320, which is connected to the anode of the protection circuit board 310 as previously described, is connected to the anode terminal 120 of the battery cell 100, the other end of the PTC element 320 is connected to the anode of the protection circuit board 310, and the cathode terminal 130 of the battery cell 100 is connected to the cathode of the protection circuit board 310. At this time, the electrical connection between the PTC element 320 and the protection circuit board 310 and the electrical connection between the cathode terminal of the battery cell 100 and the protection circuit board 310 are carried out using the nickel plates 331 and 332.

Subsequently, the nickel plates 331 and 332 are bent, such that the protection circuit board 310 can be placed on the insulative mounting member 200 in parallel with the top of the battery cell 100. The nickel plates 331 and 332 are coupled to the protection circuit board 310 such that the bent portions of the nickel plates 331 and 332 are directed to the same side.

Figure 11:
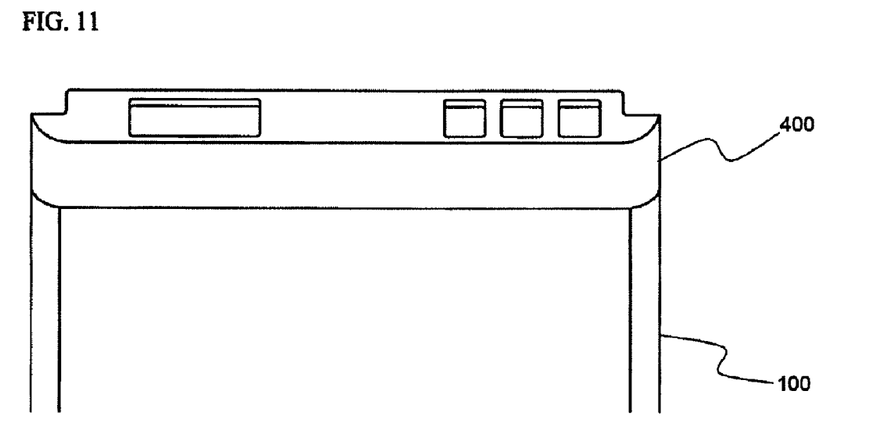

Finally, as shown in FIG. 11, the insulative cap 400 is coupled to the top of the battery cell such that the insulative cap 400 surrounds the insulative mounting member 200 while the safety element is placed on the insulative mounting member 200. The downward extending portion of the insulative cap 400 surrounds the outside of the top of the battery cell 100. Consequently, the mechanical coupling between the insulative cap 400 and the battery cell 100 is accomplished.

Figure 12:
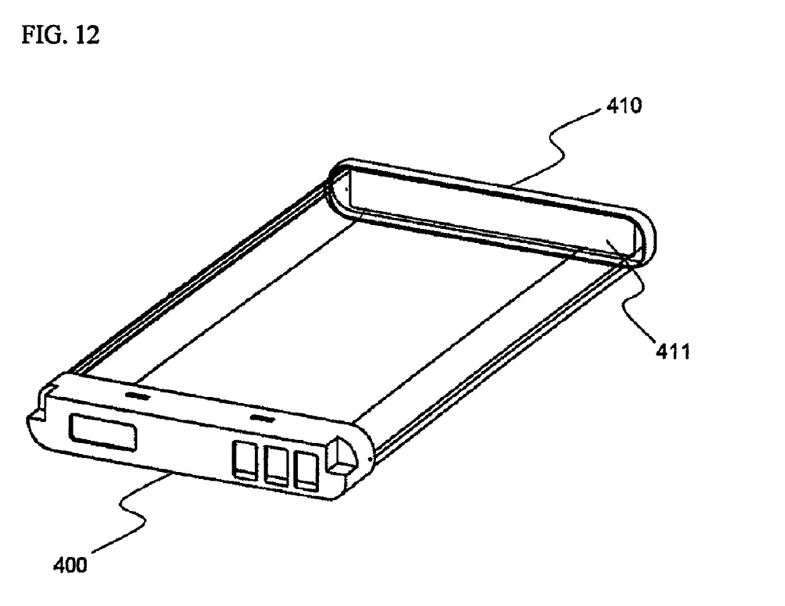
FIG. 12 is a typical view illustrating a secondary battery pack according to a preferred embodiment of the present invention.

FIG. 12 is a perspective view typically illustrating a secondary battery pack according to a preferred embodiment of the present invention constructed in a structure in which a top cap and a bottom cap are coupled to a battery cell.

Referring to FIG. 12, another insulative cap (bottom cap) 410 is coupled to the bottom of the battery cell 100 in addition to the insulative cap 400 coupled to the top of the battery cell 100. Specifically, a double-sided adhesive bottom cap tape 411 is attached to the bottom of the battery cell 100, and the insulative bottom cap 410 is fixed to the bottom of the battery cell 100 by the bottom cap tape 411.

Figure 13:
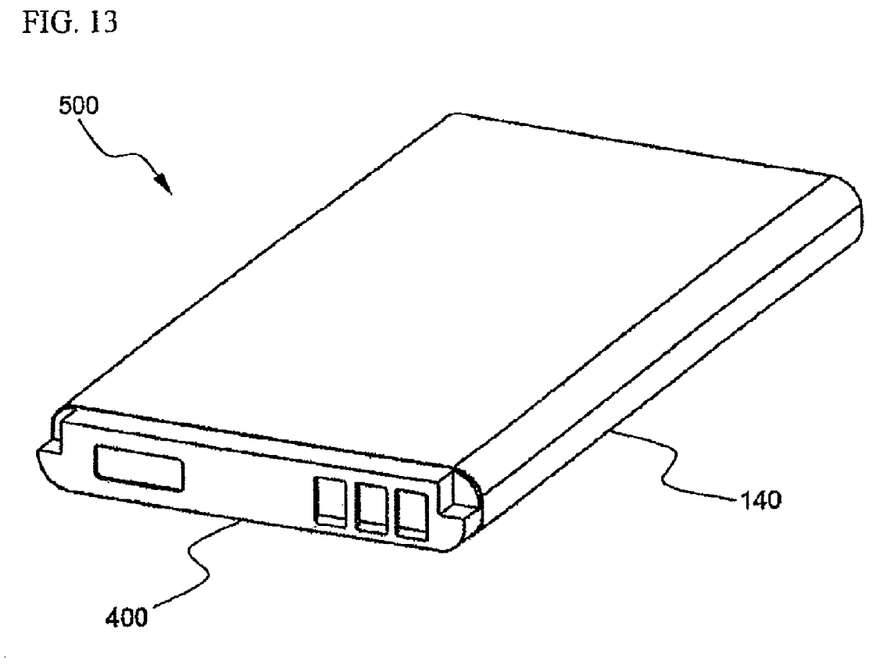
FIG. 13 is a perspective view illustrating a secondary battery pack manufactured according to a preferred embodiment of the present invention.

FIG. 13 is a perspective view illustrating a secondary battery pack manufactured according to a preferred embodiment of the present invention.

Referring to FIG. 13, the secondary battery pack 500 is constructed in a structure in which the remaining parts of the secondary battery pack 500, excluding an external input and output terminal part, are electrically insulated from the outside by the insulative top cap 400, the sheathing film 140, and the bottom cap (not shown), while the safety element and the insulative mounting member are coupled to the top of the battery cell.

The shape, position, and number of the coupling grooves, formed at the top of the battery cell, and the coupling protrusions corresponding to the coupling grooves may be changed based on the above description within the scope of the present invention.

Hereinafter, an example of the present invention will be described in more detail. It should be noted, however, that the scope of the present invention is not limited by the illustrated example.

EXAMPLE 1

Slurry, prepared by adding lithium cobalt oxide, PVdf, and a conducting agent in a generally known composition ratio, was coated on an aluminum foil to manufacture cathodes. Slurry, prepared by adding graphite, PVdf, and a conducting agent in a generally known composition ratio, was coated on a copper foil to manufacture anodes.

Separators, having a size slightly greater than that of the cathodes and the anodes, were disposed respectively between the cathodes and the anodes to manufacture an electrode assembly. The manufactured electrode assembly was mounted in a prismatic aluminum battery container. A battery container cover was mounted to the battery container, an electrolyte was injected into the battery container through an injection port, and the injection port was hermetically sealed, to manufacture a battery cell.

An insulative mounting member was placed on the top of the battery cell, such that through-holes, formed at the insulative mounting member, were aligned with coupling grooves, formed at the opposite-side ends of the top of the battery cell, and metal pins were inserted into the coupling grooves through the through-holes, as shown in FIG. 1, whereby the insulative mounting member was coupled to the battery cell.

Subsequently, a safety element was connected to the insulative mounting member, insulative top and bottom caps were coupled to the battery cell, and the outer circumference of the battery cell was covered by a sheathing film, to manufacture a secondary battery pack.

EXAMPLE 2

A secondary battery pack was manufactured in the same manner as Example 1 except that screws, as coupling members, were threadedly inserted into the coupling grooves through the through-holes, as shown in FIG. 1, such that the insulative mounting member was coupled to the battery cell.

COMPARATIVE EXAMPLE 1

A secondary battery pack was manufactured in the same manner as Example 1 except that the insulative mounting member was coupled to the battery cell by an adhesive agent applied between the insulative mounting member and the battery cell without forming the coupling grooves and the through-holes at the top of the battery cell and the mounting insulating member and without the insertion of the coupling members.

EXPERIMENTAL EXAMPLE 1

Figure 14:
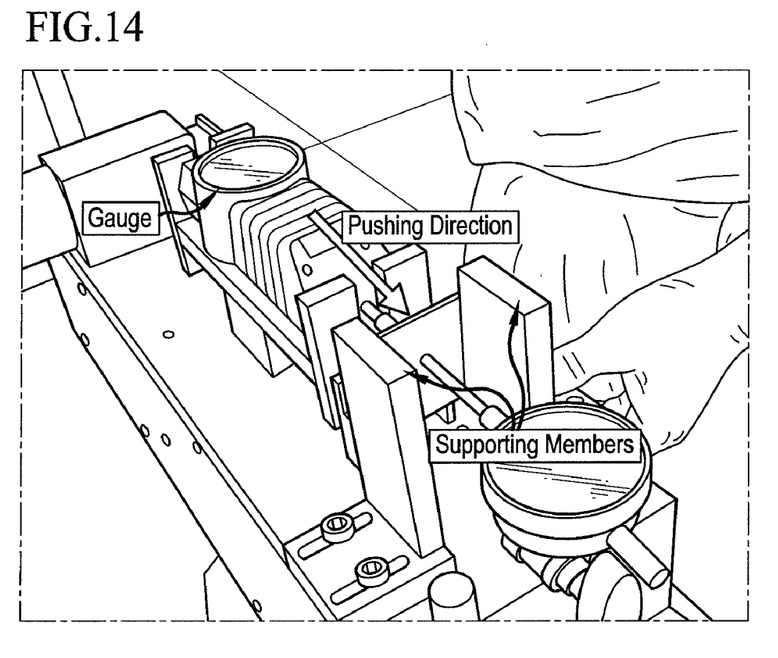
FIGS. 14 and 15 are perspective views illustrating an experimental process of Experimental example 1 of the present invention.
Figure 15:
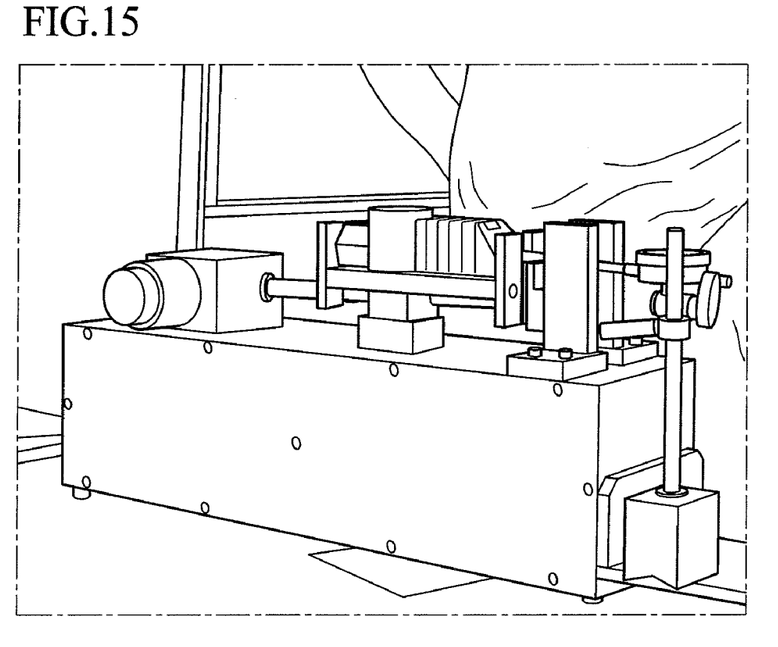

Bending tests were carried out on 20 battery packs manufactured according to Example 1, 20 battery packs manufactured according to Example 2, and 20 battery packs manufactured according to Comparative example 1, to measure the coupling strength between the battery cell of each battery pack and the insulative mounting member coupled to the battery cell (See FIGS. 14 and 15). Specifically, load applied to the middle of each secondary battery pack was gradually increased, while the top cap and the bottom cap of each secondary battery pack were fixed, to measure the magnitudes of the load when the battery packs broke. The experiment results are indicated in Table 1 below.

TABLE 1

| Breaking load (kgf) | Example 1 | Example 2 | Comparative example 1 |
|---|---|---|---|
| Less than 25 | 0 | 0 | 6 |
| 26 to 30 | 0 | 0 | 12 |
| 31 to 35 | 0 | 0 | 2 |
| 35 to 45 | 0 | 0 | — |
| 45 to 50 | 5 | 7 | — |
| 50 to 55 | 13 | 11 | — |
| More than 55 | 2 | 2 | — |

As can be seen from Table 1 above, the coupling force of the battery packs manufactured according to Example 1 and Example 2 was greatly improved as compared to the coupling force of the battery packs manufactured according to Comparative example 1.

Specifically, when a load of less than 35 kgf was applied to the battery packs manufactured according to Comparative example 1, the battery packs broke. Most of the battery packs broke even when a load of less than 30 kgf was applied to the battery packs. On the contrary, even when a load of more than 45 kgf was applied to the battery packs manufactured according to Example 1 and Example 2, the battery packs broke. Some of the battery packs withstood even a load of 55 kgf. This is because, for the battery packs manufactured according to Comparative example 1, the separation between the battery cells and the corresponding insulative mounting members occurred, when impacts having a magnitude exceeding the adhesive force of the adhesive agent were applied to the battery packs, whereas, for the battery packs manufactured according to Example 1 and Example 2, the coupling between the battery cells and the corresponding insulative mounting members was greatly increased by the insertion of the coupling members into the coupling grooves through the through-holes, even though a relative small amount of adhesive agent was used or no adhesive agent was used.

EXPERIMENTAL EXAMPLE 2

Figure 16:
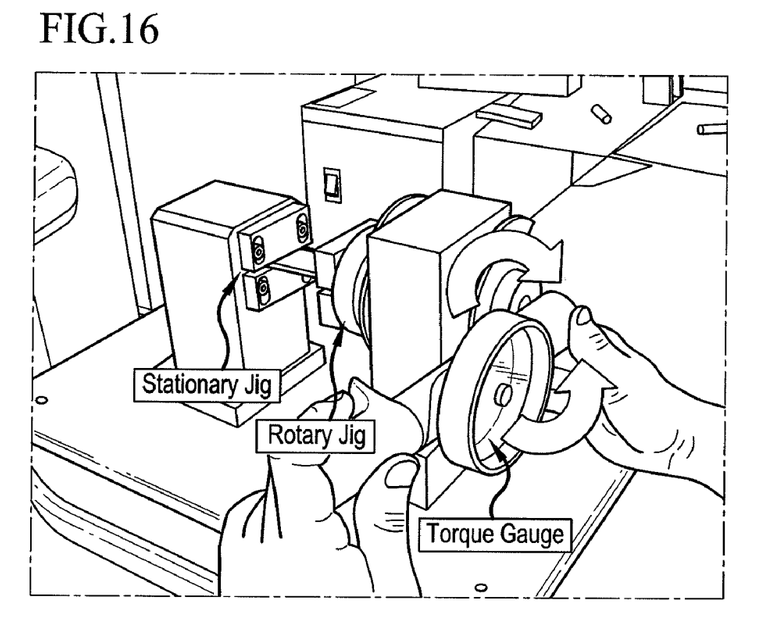
FIGS. 16 and 17 are perspective views illustrating an experimental process of Experimental example 2 of the present invention.
Figure 17:
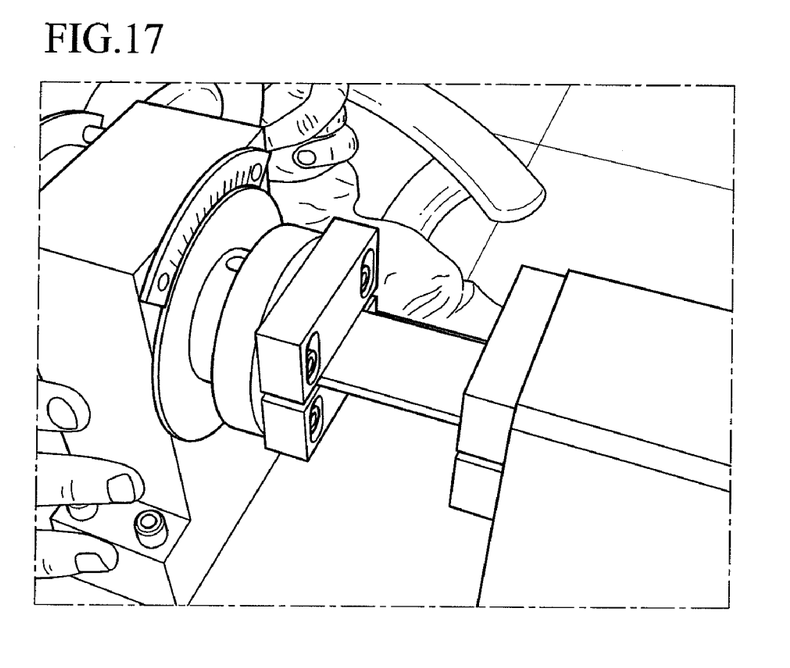

Twist tests were carried out on 20 battery packs manufactured according to Example 1, 20 battery packs manufactured according to Example 2, and 20 battery packs manufactured according to Comparative example 1, to measure the coupling strength between the battery cell of each battery and the insulative mounting member coupled to the battery cell (See FIGS. 16 and 17). Specifically, the bottom cap of each secondary battery pack was twisted in one direction, while the top cap of each secondary battery pack was fixed. At this time, the twisting force was gradually increased to manufacture the magnitudes of the twisting force when the separation between each battery cell and the insulative mounting member coupled to the top of each battery cell occurred. The experiment results are indicated in Table 2 below.

TABLE 2

| Breaking torque (kg · cm) | Example 1 | Example 2 | Comparative example 1 |
|---|---|---|---|
| 20 or less | 0 | 0 | 15 |
| 21 to 25 | 0 | 0 | 5 |
| 25 to 30 | 0 | 0 | 0 |
| 30 to 35 | 0 | 0 | 0 |
| 35 to 40 | 1 | 0 | 0 |
| 40 to 45 | 7 | 2 | 0 |
| 45 to 50 | 10 | 13 | 0 |
| More than 50 | 2 | 5 | 0 |

As can be seen from Table 2 above, the coupling force of the battery packs manufactured according to Example 1 and Example 2 was greatly improved as compared to the coupling force of the battery packs manufactured according to Comparative example 1. Specifically, when a twisting force of less than 25 kg.cm was applied to the battery packs manufactured according to Comparative example 1, the battery packs broke. On the contrary, only when a twisting force of more than 35 kg.cm was applied to the battery packs manufactured according to Example 1, the battery packs broke. Furthermore, a large number of the battery packs withstood even a load of 45 kgf. This is because, for the battery packs manufactured according to Comparative example 1, the coupling between the battery cells and the corresponding insulative mounting members were accomplished by only the adhesive agent, whereas, for the battery packs manufactured according to Example 1 and Example 2, the coupling between the battery cells and the corresponding insulative mounting members were accomplished by the insertion of the metal pins or the screws into the coupling grooves through the through-holes. Especially, the coupling force of the battery packs manufactured according to Example 1 and Example 2 was greatly increased when the twisting force was applied to the battery packs.

INDUSTRIAL APPLICABILITY

As apparent from the above description, the assembly process of the secondary battery pack according to the present invention is greatly simplified. Also, the volume of the member mounted to the top of the battery cell is minimized, the safety of the battery cell during the manufacture of the battery cell is secured, and, at the same time, the coupling strength between the battery cell and the mounting member is stably maintained. Furthermore, the coupling members are not exposed to the outside of the battery, and therefore, a possibility of a short circuit occurring is minimized while the pleasing aesthetic appearance of the product is not deteriorated.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A secondary battery pack comprising:
   a battery cell having an electrode assembly of a cathode/separator/anode structure mounted in a battery case together with an electrolyte in a sealed state;
   an insulative mounting member having openings, through which electrode terminals of the battery cell are exposed to an outside, the insulative mounting member being constructed in a structure in which a safety element is mounted to a top of the insulative mounting member, the insulative mounting member being in direct contact with the top of the battery cell; and
   an insulative cap coupled to a top of the battery cell such that the insulative cap surrounds the insulative mounting member while the safety element is mounted to the insulative mounting member, wherein the battery case is provided at the top thereof with at least one coupling groove, and the insulative mounting member is provided with at least one through-hole communicating with the at least one coupling groove, whereby the coupling of the insulative mounting member to the battery cell is accomplished by the insertion of at least one coupling member into the at least one coupling groove through the at least one through-hole such that the at least one coupling member is not exposed to an outside of the insulative cap.

2. The secondary battery pack according to claim 1, wherein the battery case is a metal container.

3. The secondary battery pack according to claim 1, wherein the insulative mounting member has a size approximately corresponding to that of the top of the battery cell, the insulative mounting member is provided at the middle thereof with a first opening, through which a first electrode terminal of the battery cell is exposed to an outside, and the insulative mounting member is provided at a position spaced a predetermined distance from the first opening with a second opening, through which a portion of the top of the battery case of the battery cell is exposed to the outside.

4. The secondary battery pack according to claim 3, wherein the insulative mounting member is provided at opposite-side ends thereof with structures protruding upward by a predetermined height such that the safety element can be stably coupled to the top of the insulative mounting member.

5. The secondary battery pack according to claim 4, wherein each protruding structure has a supporting part formed at an inside thereof in a horizontal direction.

6. The secondary battery pack according to claim 1, wherein the safety element is one or more selected from a group consisting of a positive temperature coefficient (PTC) element, a fuse, and a protection circuit board.

7. The secondary battery pack according to claim 6, wherein the safety element includes a PTC element and a protection circuit board, one end of the PTC element is connected to a first electrode terminal of the battery cell, an other end of the PTC element is connected to the protection circuit board, and a second electrode terminal of the battery cell is directly connected to the protection circuit board.

8. The secondary battery pack according to claim 7, wherein an electrical connection (a) between the PTC element and the protection circuit board and the electrical connection (b) between the second electrode terminal of the battery cell and the protection circuit board are carried out by variable connecting members.

9. The secondary battery pack according to claim 8, wherein the variable connecting member for the electrical connection (a) and the variable connecting member for the electrical connection (b) are coupled to the protection circuit board, and the variable connecting members are coupled to the respective electrode terminals of the battery cell.

10. The secondary battery pack according to claim 9, wherein the connecting members are coupled to the electrode terminals of the battery cell, while the protection circuit board is placed on the top of the battery cell such that an angle between the protection circuit board and the top of the battery cell is approximately 90 degrees or more, the variable connecting members are bent such that the protection circuit board is placed on the insulative mounting member while the protection circuit board is parallel with the top of the battery cell, and the connecting members are coupled to the protection circuit board such that the bent portions of the connecting members are directed to the same side.

11. The secondary battery pack according to claim 8, wherein the connecting members are nickel plates.

12. The secondary battery pack according to claim 1, wherein the at least one coupling member is a metal pin.

13. The secondary battery pack according to claim 12, wherein the metal pin is inserted into the at least one coupling groove of the battery case in a forced fitting fashion.

14. The secondary battery pack according to claim 1, wherein the at least one coupling member has a thread part formed at an outside thereof.

15. The secondary battery pack according to claim 14, wherein the at least one coupling member is a screw or a bolt.

16. The secondary battery pack according to claim 15, wherein the at least one coupling member is a screw.

17. The secondary battery pack according to claim 1, wherein an adhesive agent is injected into at least one of the at least one coupling groove and the at least one through-hole before the at least one coupling member is inserted into the at least one coupling groove through the at least one through-hole.

18. The secondary battery pack according to claim 1, wherein the insulative cap extends downward by a predetermined length sufficient for at least some of the insulative cap to surround the outside of the top of the battery cell while the insulative cap is mounted on the battery cell.

19. The secondary battery pack according to claim 18, wherein the downward extending portion of the insulative cap is fixed to the outside of the top of the battery cell by a bonding fashion or a mechanical coupling fashion.

20. The secondary battery pack according to claim 18, further comprising:
a sheathing film attached to an outer surface of the battery case of the battery cell.

21. The secondary battery pack according to claim 20, wherein the sheathing film is attached to the outer surface of the battery case of the battery cell such that the sheathing film surrounds the downward extending portion of the insulative cap.

22. The secondary battery pack according to claim 1, further comprising:
another insulative cap coupled to the bottom of the battery cell.

23. The secondary battery pack according to claim 1, wherein the battery cell is a prismatic lithium secondary battery cell.

* * * * *